United States Patent [19]

Graham

[11] Patent Number: 5,064,022

[45] Date of Patent: Nov. 12, 1991

[54] LADDER APPARATUS AND METHOD FOR LARGE MOBILE EQUIPMENT

[75] Inventor: George W. Graham, Wilkinson, W. Va.

[73] Assignee: Marrowbone Development Company, Naugatuck, W. Va.

[21] Appl. No.: 358,314

[22] Filed: May 30, 1989

[51] Int. Cl.$^5$ ................................................ E06C 5/04
[52] U.S. Cl. ........................................ 182/85; 182/93; 182/127; 182/208
[58] Field of Search ...................... 182/82, 85, 93, 195, 182/207, 208, 166, 141, 127; 280/166; 180/271

[56] References Cited

U.S. PATENT DOCUMENTS

| | | | |
|---|---|---|---|
| 303,337 | 8/1884 | Stoddard | 182/824 X |
| 1,087,434 | 2/1914 | Bone | 182/85 X |
| 2,548,466 | 4/1951 | Carlsen | 182/93 X |
| 2,860,822 | 11/1958 | Smith et al. | 182/127 X |
| 4,007,847 | 2/1977 | Marco | 180/271 |
| 4,054,182 | 10/1977 | Ide | 182/127 X |
| 4,236,601 | 12/1986 | Naka | 182/127 X |
| 4,243,120 | 1/1981 | Raft, Jr. et al. | 182/127 X |
| 4,467,889 | 8/1984 | Maubach et al. | 182/82 X |

Primary Examiner—Alvin C. Chin-Shue

[57] ABSTRACT

A ladder apparatus and method for use with large construction equipment, such as large tractors, mining trucks and similar vehicles that have an operator's platform or operating station located a substantial distance off the ground. The powered ladder has a fixed ladder portion rigidly attached to such a vehicle. The fixed ladder portion has spacedly attached thereto a frame element upon which a retractable ladder element is slidably disposed. The retractable ladder element is raised and lowered by an electric winch operable from the vehicle's operating station.

16 Claims, 5 Drawing Sheets

LADDER APPARATUS AND METHOD FOR LARGE MOBILE EQUIPMENT

BACKGROUND OF THE INVENTION

This invention relates to a ladder assembly mounted on large mobile vehicles, and more particularly, relates to retractable ladder assemblies for allowing access to an operator station or maintenance location on large mobile vehicles, such as large earth-moving vehicles.

While certain embodiments of the present invention are disclosed herein for use on certain types of mining and/or earth-moving vehicles, such disclosure and embodiments are by way of example and for clarity of understanding. As noted herein, the present invention has application beyond the uses explicitly disclosed herein.

Large mobile vehicles that are used to haul earthen materials for road construction or for mining are typically very large, powered vehicles. Such vehicles have very high ground clearances, which require some sort of ladder for the operator to be able to make the transition from ground level to the operator station or cab which is normally atop the powered vehicle. The prior art ladders are typically fixed ladders that start at about the bumper level and extend up to a walkway and handrail which then, at least partially, surround the operator station or cab area.

As the size and complexity of large mining and/or earth-moving vehicles increase, providing easy access to the operator station (or operating cab) and/or other maintenance or service areas is a recurring problem. The use of permanently fixed ladders on such vehicles necessarily within easy reach of the ground has not been completely satisfactory. This is especially true, since typically, the bottom portions thereof are usually placed well below the normal ground clearance of the vehicle and are therefore in a position to be damaged during normal vehicle operations. In prior art attempts to solve this problem various types of retractable steps or ladders have been devised that may be lifted or pivoted out of the way (U.S. Pat. Nos. 3,603,429 and 3,826,337). However, most of these prior art ladders are still subject to being damaged and in some cases can be shaken or jarred loose during routine vehicle operations. These ladders also require operator effort to return them to their stored position, something that is not always done.

Other prior art attempts to solve this access problem have employed some type of lower steps to make the transition to such a fixed ladder, and are usually a flexible step (or steps) that are supported by a wire rope, chain, or rubber. This step (or steps) is suspended from the bottom of either a bumper or some other appropriate frame or body element. However, such steps are generally still high above the ground and/or fixedly attached high above the ground (to a bumper), which causes an excessive amount of deflection of such a lower step away from the operator on his initial "step" onto such a lower step and makes the mounting or dismounting of the vehicle extremely difficult and hazardous.

Typical accidents that occur are the result of slips and falls from wet or icy steps while mounting and dismounting such large mobile vehicles. As is apparent in wet, muddy conditions the operator's boots or other footware become covered with materials, which often act as a lubricant and also coat the rungs/steps of any ladder. Such materials may also interfere with adequate gripping of the rungs/step by the operator's hands, whether gloved or not. Such slipping and falling type accidents are normally minor in severity, but they do result in substantial amounts of employee lost time and lost productivity. These injuries would characteristically include lacerations, contusions, fractures, and sprains.

In 1983, the U.S. Bureau of Mines sponsored a research program for the development of an improved truck ladder by Woodward Associates. A major result of that program was the development of a pretension spring ladder disposed below a bumper or appropriate frame element. Because of the fixed nature of the spring ladder and its suspension below a bumper it has not been entirely satisfactory. That is, it suffered the same shortcomings as the other prior art ladders using wire rope, chain, or rubber to suspend steps below a bumper (or other frame element). Further, the other prior art approaches to solving the problem have included folding steps, cable steps, rubber steps, and in some instances no bottom step at all. All these attempts have not been entirely satisfactory.

To solve this problem, self-retracting ladders have been proposed. However, these are typically limited to a single step and are thus not suitable for applications where substantial ground clearance of a vehicle is involved (U.S. Pat. No. 3,584,704). Other prior art ladders include a plurality of steps and a pantograph link arrangement with biasing springs to return the ladder to the stored position (U.S. Pat. No. 3,012,633); this ladder is not entirely satisfactory since it is the same size in its stored and operative positions. A self-retracting telescoping ladder (U.S. Pat. No. 3,869,022) is also a prior art ladder not entirely satisfactory in operation. Other prior art solutions are found in U.S. Pat. Nos. 4,217,971, 3,951,431, 4,021,071, 4,131,293, 4,161,997, 4,245,716, and 4,153,138 (hinge and stabilizer). These solutions are also not entirely satisfactory in operation.

These and other limitations and disadvantages of the prior art are overcome by the present invention, however, and improved apparatus and methods are provided for easy and safe access to the operator station or maintenance locations of large mobile vehicles, such as large mining and/or earth moving vehicles.

SUMMARY OF THE INVENTION

In a preferred embodiment of the present invention apparatus and method are provided for allowing an operator (normally from his operator station) to lower a retractable ladder to within approximately 12 inches of the ground. The operator then may safely exit via a modified walkway platform and the ladder of the present invention, in its extended position. The operator may then access the operator station by climbing the extended ladder, stepping onto the modified platform, and then entering the operator station. To prevent damage to the ladder from the operator forgetting to retract the ladder before moving the vehicle, the extended ladder is interlocked to the vehicle's transmission. While the vehicle is able to start, the transmission will not engage until the ladder is fully retracted and a fully retracted limit switch is tripped. The ladder is raised or lowered by a push-button switch located in the operator station. An emergency and/or maintenance switch to raise and lower the ladder from the ground level is also provided.

The preferred apparatus of the present invention comprises a fixed ladder portion, with a spacedly attached frame member attached thereto, mounted on a vehicle, and a retractable ladder element which is slidably disposed on said frame member. The retractable ladder is raised and lowered by an electric winch.

The preferred method of the present invention comprises mounting a first ladder on said vehicle, slidably mounting a second ladder adjacent said first ladder, lowering said second ladder from a retracted position to an extended position, wherein in said extended position a portion thereof is positioned proximate the earth, and preventing movement of said vehicle unless said second ladder is in its retracted position.

It is an object of the present invention to provide a ladder for a mobile vehicle that is able to extend down to a safe and convenient height above the ground for mounting and dismounting a vehicle by an operator and/or maintenance person.

It is a further object of the present invention to provide a ladder for a mobile vehicle that is more resistant to damage by being able to be raised inside of and above an bumper on such a mobile vehicle for protection.

It is an object of the present invention to provide an operator ladder for a mobile vehicle that provides for a complete rigidity of the lower steps for the operator and an ability to be moved expeditiously and in a controlled manner between a raised, stored position and a lowered, operative position.

It is an object of the present invention to provide a ladder that is easily retrofitted on large mobile vehicles, such as large mining and/or earth-moving vehicles.

It is a specific object of the present invention to provide an apparatus, comprising, a mobile vehicle, a ladder mounted on a portion of said vehicle, a movable ladder spacedly and slidably disposed adjacent said ladder, and means for moving said movable ladder between a raised and a lowered position.

It is another object of the present invention to provide operator access to a portion of a mobile vehicle, comprising, providing a position changing means having an extended and retracted position, operating said position changing means to place said means in said extended position, changing the position of an operator with said means from a first position to a second position by movement along said means, and preventing movement of said vehicle unless said means is in said retracted position.

These and other objects and advantages of the present invention will become apparent from the following detailed description wherein reference is made to the Figures in the accompanying drawings.

DETAILED DESCRIPTION OF THE INVENTION

Figure 1:
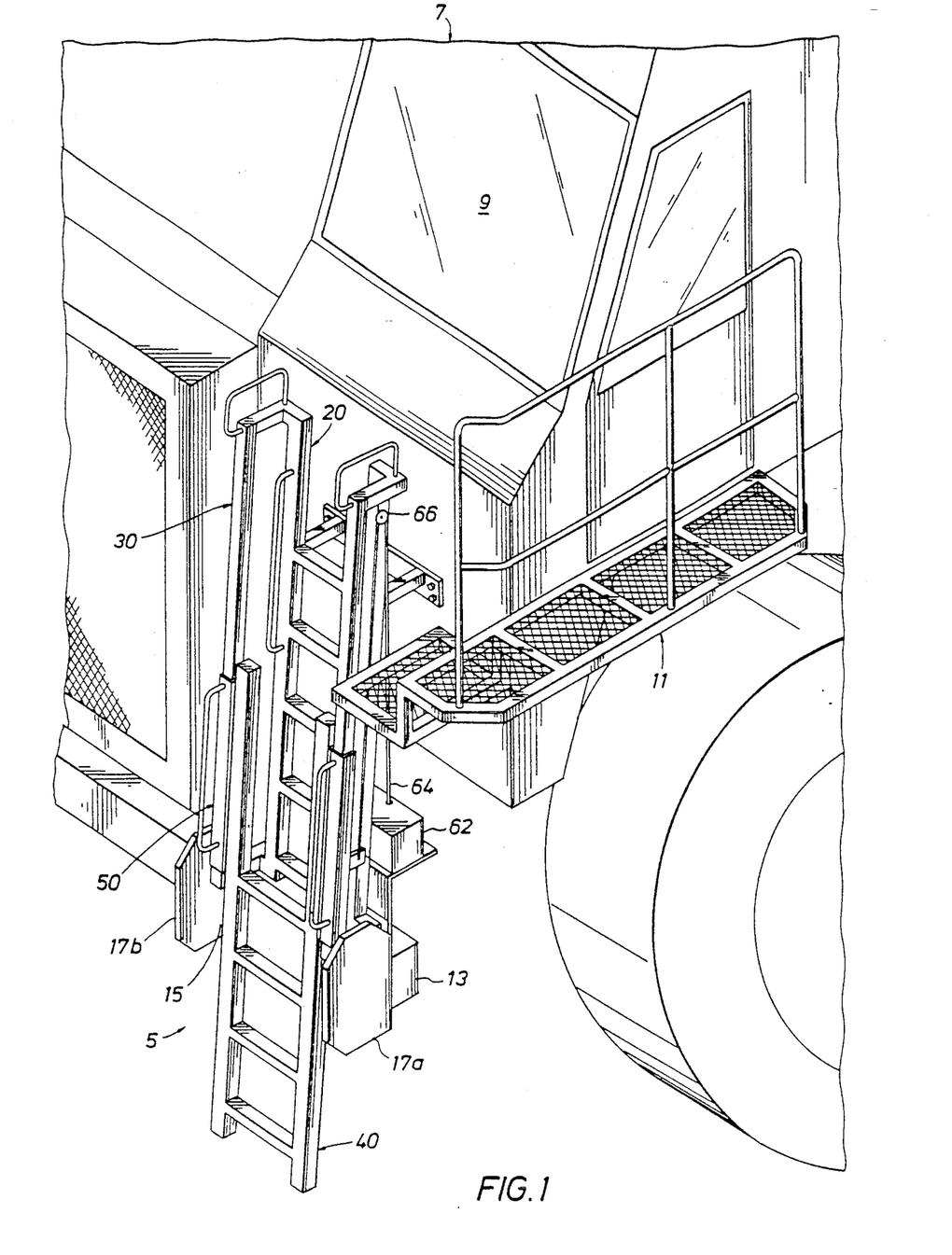
FIG. 1 is a simplified isometric view of a pictorial illustration of the ladder of the present invention mounted on a rock truck, in its extended or lowered position.

Referring now to FIG. 1, there may be seen a simplified isometric view of a pictorial illustration of the apparatus or ladder assembly 5 of the present invention mounted on a rock truck 7, and positioned in its extended, lowered, or operative position. Normally, the operator (not shown), while still in the operating cab 9 of the truck 7, is able to push a push-button (not shown) in the operating cab 9 and lower retractable ladder means or assembly 40 to within approximately 12 inches of the ground. After the operator has climbed down the ladder 5, he may then easily step onto the ground, since the lowest step of the retractable ladder assembly 40 is within approximately 12 inches of the ground. After the operator has climbed the ladder 5 back onto the modified walkway platform and handrail assembly 11 he may then enter the operator station (or operating cab) 9.

To prevent damage to the ladder 5 from the operator forgetting to retract the ladder 5 before moving the vehicle 7, the ladder 5 is preferably interlocked to the vehicle's transmission. While the vehicle is able to start, the transmission will not engage until the ladder 5 is fully raised or retracted and an associated fully raised limit switch is tripped. The ladder 5 is preferably mounted on top of or adjacent the front bumper 13 on the operator station side of the rock truck 7. The front bumper 13 of the rock truck 7 may be cut out, notched, or slotted 15 to let portions of the ladder 5 pass through this cut out area 15 when being lowered and/or raised. This keeps the ladder 5 in-board of and above the bumper 13 when it is retracted, for protection. There are also two glancer plates 17a, 17b welded to the bumper 13 on both sides of the ladder 5 for added protection against accidental collision with ladder 5.

The basic structural elements (discussed later herein) of the ladder 5 are made from square tubing that has been galvanized. The tubing is preferably perforated (not shown) so that it will relieve itself of any water, grime, and grit. The structural elements and steps are preferably made of square tubing to provide a better traction and hand grip, although tubing of any cross-section (circle, triangle, polygon, etc.) may be employed in the ladder of the present invention.

An emergency push-button control (not shown) for raising and lowering the ladder from the ground may be, and preferably is, located in a front wheel-well adjacent the ladder 5. This relatively remote but easily accessible location keeps the operator from trying to ride the ladder up, and for safety in general, prevents the operator from coming in contact with any moving parts on the ladder while it is being raised or lowered. However, it is presently contemplated that normally the ladder would be raised and lowered by the push-button control (not shown) located in the operator station 9. For access to maintenance locations there may not be an "operator station," in which case the ladder would be raised and lowered by the ground accessible push-button control. As seen in FIG. 1, the walkway assembly 11 that the operator uses to enter or leave the operator's compartment has also been modified by adding an initial "step" to allow easier access and movement to and from the ladder 5 to the assembly 11.

Figure 2:
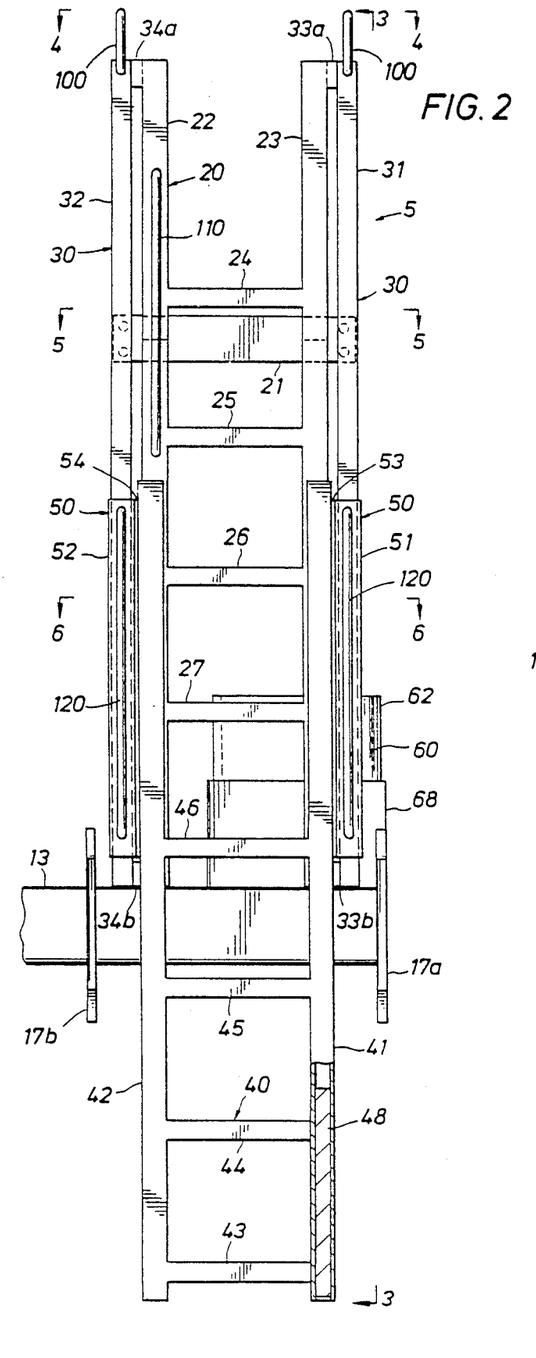
FIG. 2 is a simplified pictorial illustration of a front view of the ladder of the present invention, in its extended position.

Referring now to FIG. 2, there may be seen a simplified pictorial illustration of a front view of the ladder 5 of the present invention, in its extended, lowered, or operative position. More particularly, it may been seen that the ladder 5 may consist of a fixed ladder means or assembly 20, which may be fixedly mounted on top of a bumper or other structural element 13 of a vehicle, at its lower end, and to such a vehicle (not shown) via mounting element 21, adjacent its upper end, along with a separate but rigidly and spacedly affixed frame element means or assembly 30 on which a means for slidable engagement of the retractable ladder means or assembly 40 slides. Further, it may be seen that the retractable ladder assembly 40 may be a ladder constructed of the same material as the fixed ladder assembly 20 and having an oversized sleeve means or assembly 50, as its means for slidable engagement, rigidly attached along the sides of and adjacent the upper end of ladder 40, and which sleeve 50 slidably engages the separate frame element 30 of the fixed ladder 20. The slidable sleeve assembly 50 of retractable ladder assembly 40 is preferably tubing of one size larger than the size with a close enough tolerance that it would normally be used for any telescoping tubing. This keeps the side elements of ladder 5 from accumulating dirt or grit while being raised or lowered. Ladder 5 (and any or all of its subassemblies) may be bolted and/or welded together and bolted or welded to its respective mounting locations on a vehicle.

Figure 4:
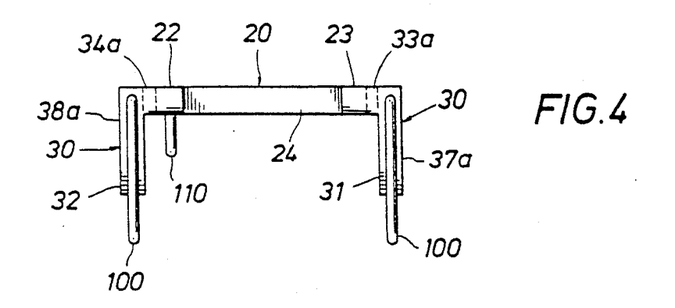
FIG. 4 is a simplified pictorial illustration of a cross-sectional view through a portion of the ladder depicted in FIG. 2.
Figure 5:
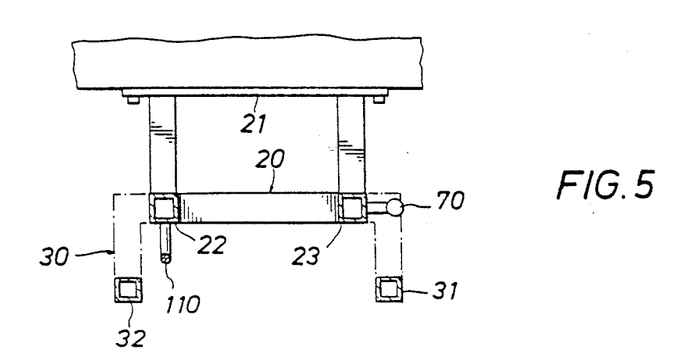
FIG. 5 is a simplified pictorial illustration of a cross-sectional view through a different portion of the ladder depicted in FIG. 2.
Figure 6:
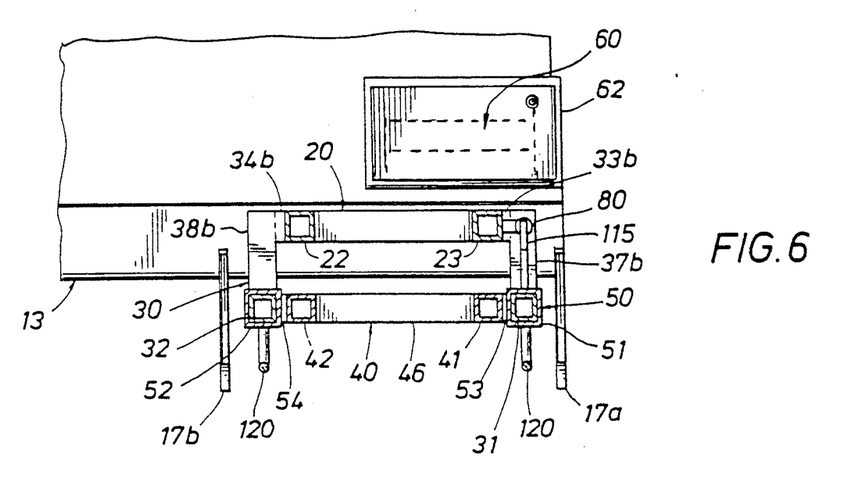
FIG. 6 is a simplified pictorial illustration of a cross-sectional view through yet a different portion of the ladder depicted in FIG. 2.

Fixed ladder assembly 20 may be, and preferably is, made up of two vertical tubular side elements 22, 23 interconnected by a plurality of spaced apart horizontal rungs or steps 24, 25, 26, 27, 28 (28 is not visible in FIG. 2). Similarly, retractable ladder assembly 40 may be, and preferably is, made up of two vertical tubular side elements 41, 42 interconnected by a plurality of spaced apart horizontal rungs or steps 43, 44, 45, 46. Again, such rungs and vertical side elements may be bolted and/or welded together, as well as being stamped from a single piece of metal. For clarity and ease of understanding, in FIG. 2 the pair of vertical side elements 41, 42 of retractable ladder 40 are shown spaced slightly more apart than the corresponding pair of vertical side elements 22, 23 of fixed ladder 20, so that both ladders' pair of side elements may be seen at the same time. FIGS. 4–6 more accurately depict the locations and spacings of these two pairs of vertical side elements.

In general, frame element 30 may have a slightly wider spacing than fixed ladder 20 to allow for access to ladder 20 when retractable ladder 40 is extended. Similarly, fixed ladder 20 and retractable ladder 40 may have the same spacing to avoid changes in the overall ladder 5 spacing in its extended position. Such a common ladder spacing allows for sleeve assembly 50 to attach to retractable ladder 40 along its sides. However, it is also possible to have ladder 20, frame 30, and ladder 40 all of the same spacing in which case sleeve 50 would attach to the back of ladder 40, rather than its side.

Thus, the spacings of these elements may be changed and any such modifications are clearly within the scope of and contemplated by the present invention.

Further, it is possible to use only one side of frame element 30 and a corresponding side of sleeve 50 to attach retractable ladder 40 to fixed ladder 20. Such a single side interconnection should have sufficient strength and rigidity to accommodate the operator's weight and still provide a relatively rigid ladder. It is also possible to use steps and/or rungs extending from the two opposite sides of such a single sided sleeve 50 to provide an appropriate ladder means; the fixed ladder 20 may also be so modified. In addition, it is also possible to use any existing ladder already mounted on a vehicle as fixed ladder 20 and then appropriately mount frame element 30 to the vehicle or existing ladder (in a manner similar to that described herein for attaching ladder 20 to the vehicle). Such modifications are clearly within the scope of and contemplated by the present invention.

Figure 3:
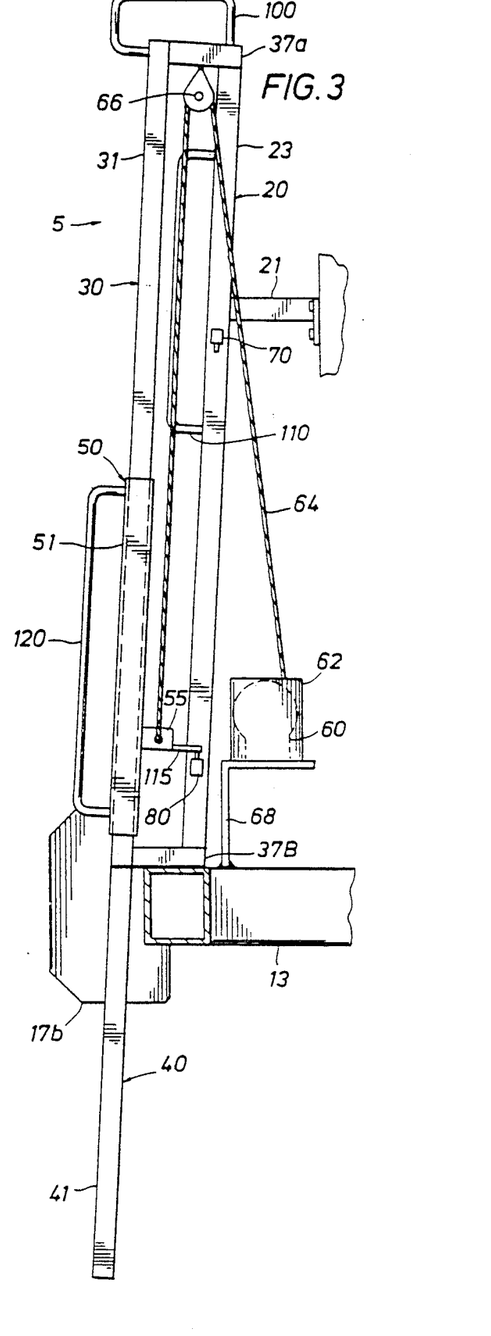
FIG. 3 is a simplified pictorial illustration of a side view of the ladder depicted in FIG. 2.

Frame element assembly 30 may be, and preferably is, affixed to fixed ladder 20 in the following manner. Each vertical side element 22, 23 of ladder 20 may have fixedly attached thereto transition pieces 34a, 33a at its top and 34b, 33b at its bottom, respectively, i.e., element 22 has attached thereto transition pieces 34a (at its top end) and 34b (at it bottom end). These transition pieces 34a,b and 33a,b may also be fixedly attached to corresponding spacer pieces 38a,b and 37a,b (with "a" at the top and "b" at the bottom), respectively. Refer to FIG. 3 for the location of spacer pieces 37a,b (spacer pieces 38a,b are similarly located on the left side of FIG. 2). Side elements 32, 31 of frame element assembly 30 in turn may be fixedly attached to the ends of the spacer pieces 38a,b and 37a,b, respectively. Although described herein as two "pieces", such a "transition" and "spacer" piece may be easily constructed as one piece. Further, the length of side elements 31, 32 may be greater than or less than that of side elements 22, 23 which may require additional "pieces" (not shown) between each transition piece and its corresponding spacer piece to compensate for such differences in lengths. Such pieces may be bolted and/or welded to their attaching elements or pieces.

The sleeve assembly 50 preferably consists of vertical tubular side elements 51, 52 that are slidably disposed on side elements 31, 32, respectively, of frame assembly 30. These side elements 51, 52 may be, and preferably are, fixedly attached to the upper portion of corresponding side elements 41, 42 of retractable ladder 40, by means of appropriate spacers 53, 54, respectively. However, such spacers may be eliminated, or employed in multiple pieces rather than one piece as depicted. Again, interconnection may be by bolting and/or welding.

The length of the fixed ladder 20 is chiefly determined by the distance from the bumper 13 to the walkway assembly 11. As depicted in FIG. 1, the walkway assembly 11 (walkway and associated handrail) has been modified to provide a "step" to allow for easier transition from the ladder 5 to the walkway 11, or vice versa. The use and height of such a "step" also allows for some adjustment of the length of ladder 20. The handrail has also been modified to provide a closer fit (less clearance) to the open door of the operator cab 9 in order to require this door be closed to exit the cab 9.

The length of the retractable ladder 40 is chiefly determined by the height of the vehicle above the ground and the desired twelve-inch height of its bottom step above the ground, in an extended position. Similarly, the number of steps on both the fixed 20 and retractable 40 ladder is chiefly determined by their length and desired spacing between steps (usually about twelve inches).

Referring now to FIG. 3, there may be seen a simplified pictorial illustration, in side view, of the ladder of the present invention, as depicted in FIG. 2. As may be seen from this Figure a means for raising and lowering which is preferably an electric winch 60 (dotted line shadow inside protective cover 62) that raises and lowers the retractable ladder 40 by means of a wire cable 64 which runs over a pulley 66. Wire cable 64 attaches to lifting lug 55 attached to the back side of sleeve assembly 50. Pulley 66 is attached to the bottom of spacer piece 37a between the fixed ladder 20 and its frame element 30. Pulley 66 is appropriately attached to piece 37a, such as by an eyebolt bolted to piece 37a and has a safety link connecting the eyebolt to the pulley. It is also possible to appropriately locate the means for raising and lowering near the top of the ladder (not shown) and eliminate pulley 66.

As may also be seen in these Figures there are guards (glancer plates) 17a, 17b that are located around the ladder 5 to protect it from being damaged by collisions in the event the vehicle should accidentally have a collision. Further, there is a cover 62 around the winch 60 to prevent grime and dirt from accumulating in the winch 60. There also may be seen the up 70 and down 80 limit switches whose function will be described later herein.

Preferably, counterweights 48 may be added inside the lower portion of both side elements 41, 42 of the retractable ladder 40 to help the ladder movement when it is being lowered. Preferably, counterweights 48 are portions of square bar stock that will fit inside elements 41, 42. The preferred mechanism that raises and lowers the ladder is a 12-volt electric winch 60 mounted on top of the truck bumper 13 behind the ladder 5. For clarity and ease of understanding, in FIGS. 1, 2, and 3, winch 60 is shown attached to mounting member 68 attached to the bumper 13. However, winch 60 may be mounted directly on bumper 13 or in any other convenient location. A winch location on the "outside" part of the ladder is preferred for ease of access for maintenance, although other locations are clearly operable. The power for the winch is supplied from the truck's battery (not shown in this Figure). Although the winch is described herein as electric and thereby using an electric motor, it may also be hydraulic, or use any other appropriate power source.

The spacing between the fixed 20 and retractable 40 ladders is a matter of choice and is determined by the length of spacer pieces 37a,b, 38a,b between the fixed ladder 20 and its attached frame element 30. If it is desired to have handholds on fixed ladder 20 (as noted later herein), and as is presently preferred, the spacing between the fixed and retractable ladders must be great enough to accommodate the height of this handhold above fixed ladder 20. Similarly, the positions of the fixed and retractable ladders in FIG. 3 may be appropriately reversed, i.e. the fixed ladder on "top" and the retractable ladder underneath the fixed ladder; such a configuration requires a cutout in bumper 13 to allow the retractable ladder to lower.

Referring now to FIG. 4, there may be seen a simplified cross-sectional view of a portion FIG. 2. This basically top view clearly depicts the spatial relationship between the fixed ladder assembly 20 and associated frame element 30, as well as the presently preferred interconnections therebetween. Also depicted are two handhold rungs 100, located on the top of the frame element 30, which are for ease of movement from the ladder assembly 5 to the walkway platform and handrail 11. For purposes of clarity and ease of understanding, most of the portions of the ladder assembly 5 that would normally be seen in this figure below the fixed portion 20 and frame element 30 at this cross-sectional position have not been depicted. Also shown is a preferred single handhold 110 mounted on ladder 20 to provide a transitional handgrip from rungs 44 to rungs on the retractable ladder 24 (as noted later herein). Separate hand rungs are provided to prevent the problem of slippery material buildup which may occur on the ladder steps from material on the operator's footwear.

Referring now to FIG. 5, there may be seen a simplified cross-sectional view at a different height of FIG. 2. This cross-sectional view from the top is similar to that of FIG. 4. Again the frame element 30, ladder 20, and their interconnection are clearly depicted, as well as up limit switch 70. Again, for purposes of clarity and ease of understanding, most of the portions of the ladder assembly 5 below the fixed portion 20 and frame element 30 at this cross-sectional position have not been depicted.

Referring now to FIG. 6, there may be seen a simplified cross-sectional view at yet a different height of FIG. 2. This view from the top clearly depicts the presently preferred spacing between the fixed 20 and retractable 40 portions of the ladder 5, and the slidable engagement of the retractable portion's sleeve element 50 on the frame element 30. Also depicted are winch 60 (a dotted line shadow inside cover 60) and its protective box 62. Down limit switch 80 is also depicted, as well as limit switch tripping arm 115, which is presently preferred to be fixedly attached to the sleeve element 50 of the retractable ladder 40. Preferably, lower handhold rungs 120 are provided and are shown preferably attached to box element 50. The presently preferred interconnection means between ladder 20 and frame element 30 (transition pieces 33b, 34b and spacer pieces 37b, 38b, all "b" for bottom) may also be seen in this figure. The use of square tubing for the structural elements of the fixed and retractable portions of the ladder assembly 5 is also clearly depicted in FIGS. 4–6.

The vertical tubular side members 51, 52 of sleeve element assembly 50 should be of sufficient length to provide an essentially rigid ladder when the operator steps onto the retractable portion 40 of the ladder assembly 5. In a similar manner, the size and fit of the inside opening of the side members 51, 52 around the side members 31, 32 (respectively) of frame element 30 should provide sufficient space therebetween to allow for easy lowering and raising of retractable ladder 40. Both the length (depicted as about half the length of ladder side member 41) and inside diameter or size of side members 51, 52 should be selected to provide an essentially rigid extended ladder; their selection depends upon the actual ladder length of the retractable portion needed for its bottom step to extend to within about twelve inches of the ground (in the extended position) and the length of side members 31, 32 of frame element 30.

Figure 7:
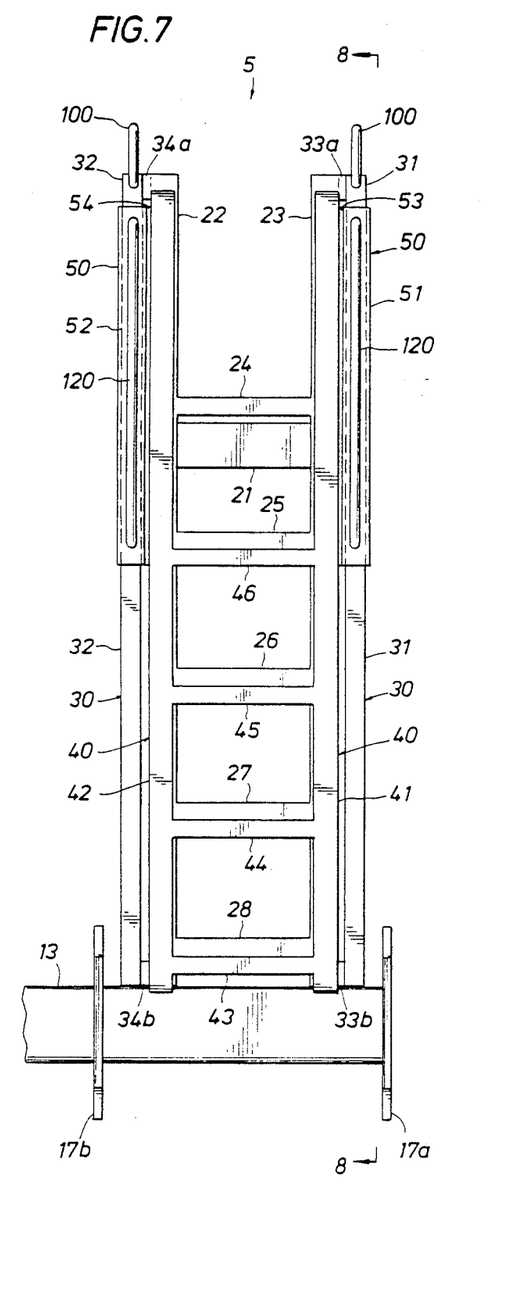
FIG. 7 is a simplified pictorial illustration of a front view of the ladder of the present invention, in its retracted or raised position.
Figure 8:
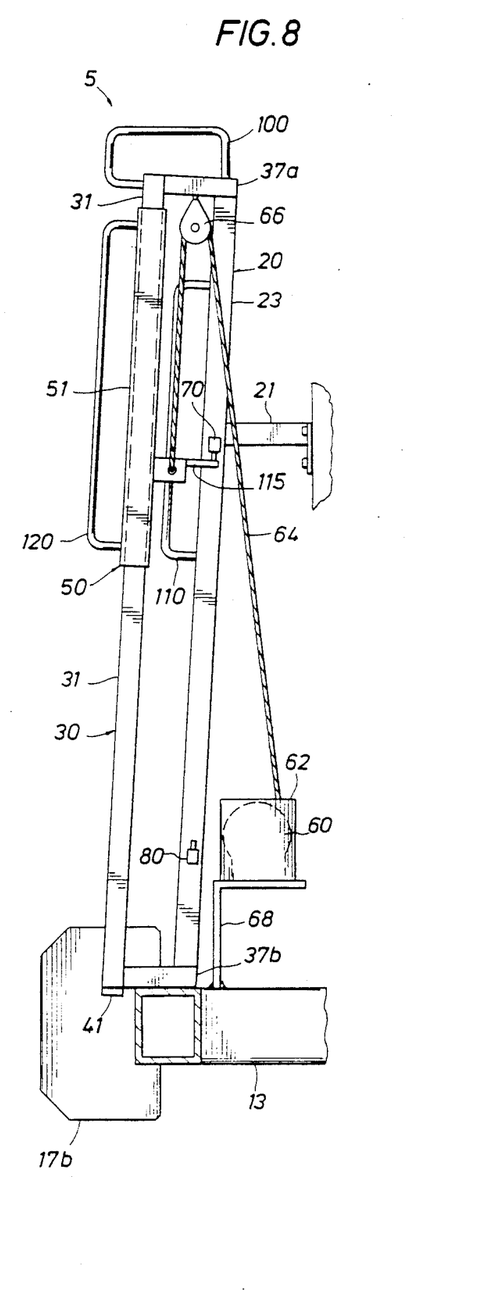
FIG. 8 is a simplified pictorial illustration of a side view of the ladder depicted in FIG. 7.

FIGS. 7 and 8 correspond to FIGS. 2 and 3 respectively, but depict the retractable ladder 40, in its raised, retracted, or stored position. However, FIG. 7 does not depict winch 60, its cover 62, or mounting bracket 60. FIG. 7 also depicts the spacing of the side elements of the ladder portions (of ladders 20 and 40) in the same manner as noted earlier herein for FIG. 2. These Figures (7 and 8) clearly depict how the retractable ladder 40 in its raised position is raised above the bumper 13, well above any required vehicle ground clearance. Similarly, the glancer plates 17a, 17b are clearly depicted as providing additional collision protection to the ladder assembly 5 in its retracted position.

Although the relative lengths of fixed ladder 20, frame element 30, and retractable ladder 40 are shown in FIGS. 7 and 8 as being the same, this is not required. However, for ease of construction, it is presently preferred that fixed ladder 20 and retractable ladder 40 have side elements of the same length and size and be spaced apart by steps or rungs of the same length (and with rungs spaced apart the same distance on both ladders). The number of rungs employed on both ladders may be the same, although for a working embodiment the retractable latter 40 had four rungs disposed at its lower end and the fixed ladder 20 had five rungs, as depicted in FIG. 1. For this working embodiment the retractable ladder 40 had a total travel of about three feet.

Further, the bumper 13 of FIGS. 2-8 may be replaced by a flat plate (not shown) to provide a base for the ladder assemblies and winch, and thereby provide a "skid-mounted" ladder assembly for easily "backfitting" the installation of such ladders on mobile vehicles. Such modification and use is contemplated by the present invention.

The ladder 5 should have appropriate caution signs mounted at strategic locations on the outside of the truck warning never to operate the ladder with anyone standing on or near the ladder mechanism. There should also be a caution sign located inside of the operator's compartment 9 next to push-button control (not shown) for the ladder 5. It should state that the truck will not move until the ladder is fully retracted.

Thus, it may be seen that the present invention provides a method for providing an operator access to a portion of a mobile vehicle, comprising, mounting a first ladder on said vehicle, slidably mounting a second ladder adjacent said first ladder, lowering said second ladder from a retracted position to an extended position, wherein in said extended position a portion thereof is positioned proximate the earth, and preventing movement of said vehicle unless said second ladder is in its retracted position.

Figure 9:
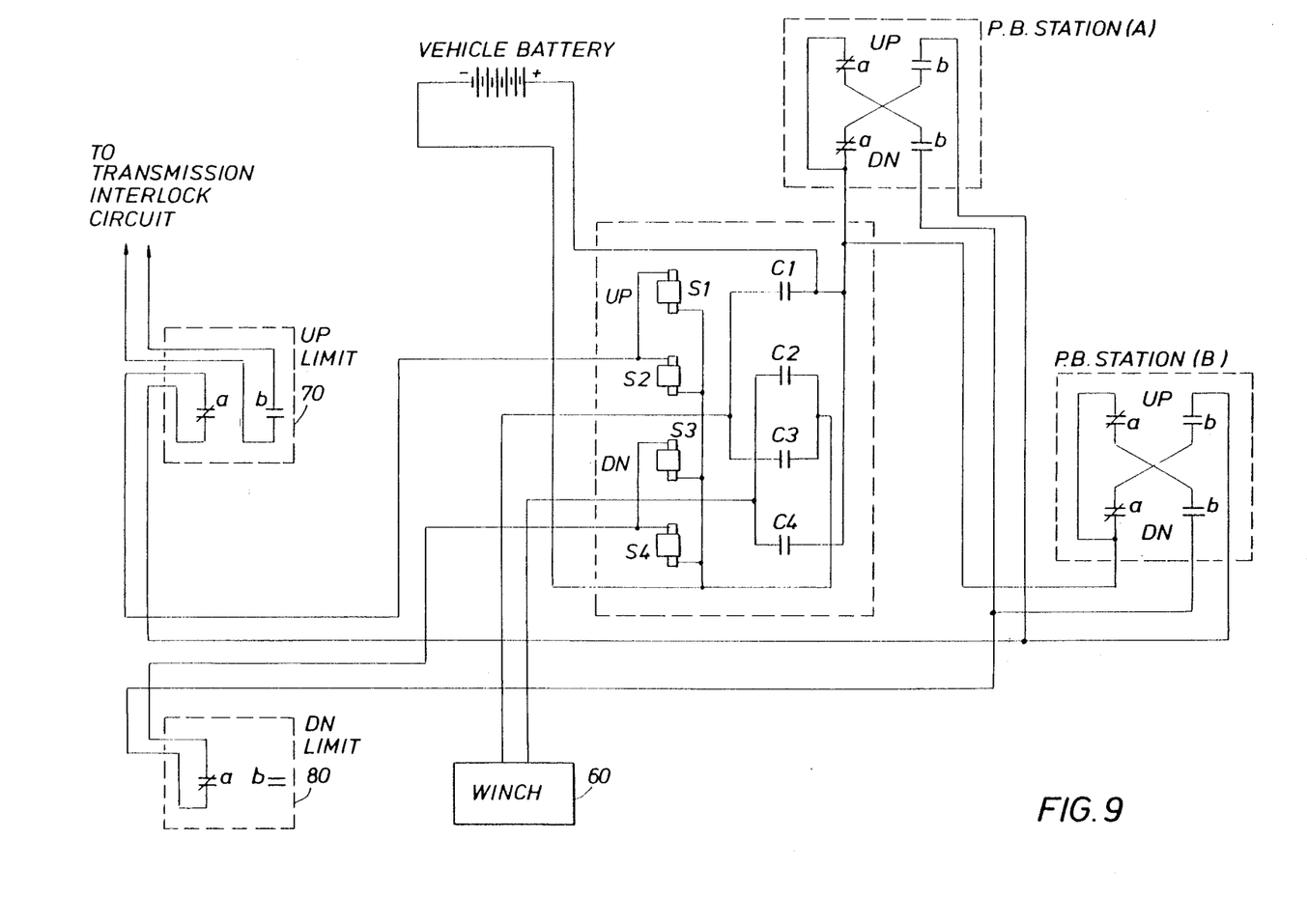
FIG. 9 is a simplified functional wiring diagram of the electrical components of the ladder of the present invention.

Referring now to FIG. 9, there may be seen a simplified electrical wiring diagram for the ladder of the present invention. It may be seen that there is an up limit switch 70 associated with the ladder 5 which is interlocked with the transmission circuit of the vehicle, for reasons noted earlier herein. There is also a down limit switch 80 which prevents the winch 60 from releasing too much cable and allowing the cable to snarl in the winch. Once one of the limit switches is engaged an automatic brake on the winch may stop the winch. As noted in this Figure, the winch is preferably driven by a battery on the vehicle. This battery may be the vehicle's main battery, or an appropriate auxiliary battery to provide power if the vehicle's electrical system fails. However, allowing the vehicle to start, but not move until the ladder is retracted, avoids the possibility of the operation of the winch somehow discharging the vehicle's battery before the vehicle is started.

As also noted in this Figure there are two push-button stations (P.B. Station), "A" and "B", at which the ladder may be raised or lowered. One of these stations is in the operator cab and the other is in a wheel well, as noted earlier herein. Further, as shown, there are several relays S1-S4 and associated contacts C1-C4, which are appropriately energized to provide the proper polarity to the winch motor to either raise or lower the retractable ladder 40.

The basic operation of this circuit is as follows. To raise or lower the ladder 40, either one of the push-button stations (P.B. station), A or B, may be employed. Each push-button station has an "up" and a separate "down" push-button. For discussion purposes, assume station "A" is in the operator cab and its "up" button is pushed. This closes normally open (N.O.) contact "b" for the A station "up" button. This A station "up" button must be held in a depressed position until the ladder stops by tripping its up limit switch 70. This "push and hold" type push-button switch should be employed, as a safety feature, for the ground operated switch (in the wheel well) to prevent the operator, or anyone else, from trying to ride the ladder as it is raised. However, a "push and release" type push-button switch may safely be employed in the operator station.

The closing of N.O. "up" contact "b" at station A provides power to the coils of relays S1 and S2 through normally closed (N.C.) contact "a" of up limit switch 70. Energizing the coils for relays S1 and S2 causes contacts C1 and C2, respectively, to close. Contact C1 provides positive voltage to the positive terminal of winch 60 from the positive battery terminal and contact C2 provides negative voltage to the negative terminal of winch 60 from the negative battery terminal. Thus, winch 60 raises ladder 40, until up limit switch 70 is tripped, which opens N.C. contact "a" and closes N.O. contact "b" on switch 70. The opening of contact "a" of switch 70 de-energizes relays S1 and S2, which in turn, through contacts C1 and C2, de-energize winch 60. Winch 60 has an automatic brake to stop the winch in this position. In a similar manner, a "down" button energizes relays S3 and S4, via the N.C. contact "a" on down limit switch 80, to reverse the polarity applied to winch 60, and cause winch 60 to lower ladder 40.

Although discussed herein in terms of an electric winch (i.e. an electric motor) as providing the means to raise and lower ladder 40, clearly any other type of power source means may be employed. For example, but not by way of limitation, a hydraulic motor may be employed as the means for raising and lowering, in which case the hydraulic functional equivalents of the circuit elements of FIG. 9 may be employed. Similarly, such an electric winch may be employed to only raise ladder 40 and allow gravity and the weight of ladder 40 to lower ladder 40 to its extended position; for such a case the winch's brake needs to be "released" (or have a frictional drag type brake) to allow ladder 40 to lower when a "down" push-button is pushed until the down limit switch 80 is tripped. Such modifications are clearly within the scope of and contemplated by the present invention.

Accordingly, it may be seen that the ladder assembly of the present invention is easy to make, install and operate. It is inherently safe in operation, rugged and durable, and may be made of low cost and readily available materials. It provides a safe and easy access to operator stations and/or maintenance locations on a mobile vehicle.

Further, it may be seen that the present invention provides a method for providing an operator access to a portion of a vehicle, comprising, providing a position changing means having an extended and retracted position, operating said position changing means to place said means in said extended position, changing the position of an operator with said means from a first position to a second position by movement along said position changing means, and preventing movement of said vehicle unless said means is in said retracted position. The position changing means has previously been disclosed herein in "vertical" configurations, i.e. allowing an operator to move from the earth, at one position or vertical elevation, to an operator and/or maintenance station, at a second position or vertical elevation. However, it is also possible to configure the position changing means (the ladder assembly 5) in a horizontal rather than vertical configuration, for use on segmented or similar type vehicles.

Many other variations and modifications may be made in the apparatus and techniques hereinbefore described by those having experience in this technology without departing from the concept of the present invention. Accordingly, it should clearly understood that the apparatus and methods depicted in the accompanying drawings and referred to in the foregoing description are illustrative only and are not intended as limitations on the scope of the present invention.

What is claimed is:

1. Apparatus for providing access to an operator station on a large mobile vehicle, comprising:
   a ladder fixedly mounted on such a vehicle, said ladder having substantially parallel side stringers and transverse treads,
   a frame element fixedly attached to said fixedly mounted ladder and spaced therefrom, said frame element having parallel stringers that are aligned with and spaced from the stringers of said ladder,
   a retractable ladder slidably disposed on the stringers of said frame element,
   means for raising and lowering said retractable ladder, and
   means for controlling said means for raising and lowering.

2. Apparatus as described in claim 1, wherein said means for raising and lowering comprises an electric winch.

3. Apparatus as described in claim 2, wherein said means for controlling comprises at least one push-button switch.

4. Apparatus for providing access to an operation station on a mobile vehicle, comprising:
   a ladder fixedly mounted on such a vehicle, said ladder having substantially parallel side stringers and transverse treads,
   a frame element fixedly attached to such a vehicle adjacent said frame element's top and bottom, said frame element being spaced from said fixedly mounted ladder, and having parallel stringers aligned with the stringers of said ladder,
   a sleeve member slidably disposed on the stringers of said frame element,
   a retractable ladder fixedly attached to said sleeve member, said retractable ladder being disposed to extend said fixed ladder to a position adjacent the earth, and
   means for raising and lowering said retractable ladder.

5. Apparatus as described in claim 4, further comprising:
   means for protecting both said ladders and mounted on such a vehicle adjacent said ladders.

6. Apparatus as described in claim 4, further comprising:
   walkway means mounted on such a vehicle adjacent said fixedly mounted ladder and having a step therein adjacent said fixedly mounted ladder.

7. Apparatus as described in claim 4, further comprising:
   means for preventing movement of such a vehicle when said retractable ladder is lowered.

8. Apparatus as described in claim 4, wherein said means for raising and lowering comprises, an electric winch and at least one means for controlling said winch.

9. Apparatus as described in claim 8, wherein said means for controlling comprises a push-button switch.

10. Apparatus as described in claim 4, wherein said fixedly mounted ladder and said retractable ladder have the same width.

11. Apparatus as described in claim 10, wherein the width between the stringers of said frame elements is greater than the width between the stringers of said fixed ladder.

12. Apparatus as described in claim 11, wherein said fixedly mounted ladder and retractable ladder have the same length.

13. Apparatus as described in claim 12, wherein a bottom portion of said retractable ladder moves from an extended position adjacent the earth to a retracted position above the ground clearance of such a vehicle.

14. Apparatus as described in claim 13, wherein said means for raising and lowering is interconnected with the transmission of such a vehicle to prevent vehicle movement when said retractable ladder is not in its retractable position.

15. Apparatus as described in claim 14, further comprising:
   a walkway means mounted on such a vehicle adjacent said fixedly mounted ladder, and having a step therein adjacent said fixedly mounted ladder.

16. Apparatus as described in claim 14, further comprising, means for protecting both said ladders and mounted on such a vehicle adjacent said ladders.

* * * * *